United States Patent [19]

Yonemoto et al.

[11] Patent Number: 5,626,641

[45] Date of Patent: May 6, 1997

[54] METHOD OF MANUFACTURING A GLASS BLANK USED FOR OPTICAL GLASS ELEMENTS

[75] Inventors: Tadayoshi Yonemoto, Moriguchi; Yoshiyuki Shimizu, Neyagawa; Takashi Inoue, Hirakata; Toshihiko Muroi, Minami Aizu-gun, all of Japan

[73] Assignees: Matsushita Electric Industrial Co., Ltd., Osaka; Sumita Optical Glass Co., Ltd., Tokyo, both of Japan

[21] Appl. No.: 376,677

[22] Filed: Jan. 23, 1995

Related U.S. Application Data

[63] Continuation of Ser. No. 65,500, May 24, 1993, abandoned.

[30] Foreign Application Priority Data

Jun. 4, 1992 [JP] Japan ................................. 4-143927

[51] Int. Cl.⁶ ............................................. C03B 7/00
[52] U.S. Cl. ........................... 65/29.12; 65/32.5; 65/72; 65/85; 65/122; 65/123; 65/126; 65/158; 65/374.12; 65/374.13; 65/374.15
[58] Field of Search ........................... 65/21.1, 32.5, 65/72, 68, 75, 83, 85, 122, 123, 126, 127, 374.12, 374.13, 374.15, 133, 29.12, 158; 264/1.1, 1.21

[56] References Cited

U.S. PATENT DOCUMENTS

| | | | |
|---|---|---|---|
| 3,233,993 | 2/1966 | Weidel | 65/32.5 |
| 3,271,126 | 9/1966 | Jenkins . | |
| 3,293,017 | 12/1966 | Jenkins . | |
| 3,743,492 | 7/1973 | Ogita | 65/32.5 |
| 3,833,347 | 9/1974 | Angle et al. . | |
| 3,900,328 | 8/1975 | Parsons et al. | 65/32.5 |
| 3,961,927 | 6/1976 | Alderson et al. . | |
| 4,139,677 | 2/1979 | Blair et al. | 65/325 |
| 4,721,518 | 1/1988 | Monji et al. . | |
| 4,983,198 | 1/1991 | Ogino | 65/32.5 |
| 5,171,347 | 12/1992 | Monji et al. | 65/32.5 |

FOREIGN PATENT DOCUMENTS

| | | |
|---|---|---|
| A30146315 | 6/1985 | European Pat. Off. . |
| A10191618 | 8/1986 | European Pat. Off. . |
| A10250091 | 12/1987 | European Pat. Off. . |
| 0305792A2 | 3/1989 | European Pat. Off. . |
| A10378292 | 7/1990 | European Pat. Off. . |
| 0408065A2 | 1/1991 | European Pat. Off. . |
| 3924238A1 | 1/1990 | Germany . |
| 51-24525 | 7/1976 | Japan .................................. 65/122 |
| 64-72927 | 3/1989 | Japan .................................. 65/126 |
| 1-226742 | 9/1989 | Japan .................................. 65/127 |
| 4-187527 | 7/1992 | Japan .................................. 65/83 |
| 4-331727 | 11/1992 | Japan .................................. 65/72 |
| 4-357123 | 12/1992 | Japan .................................. 65/68 |
| 6-239619 | 8/1994 | Japan .................................. 65/123 |
| 378199 | 8/1932 | United Kingdom ................... 65/32.5 |
| 766854 | 1/1957 | United Kingdom . |

OTHER PUBLICATIONS

European Search Report 93108886.8–dated Aug. 31, 1993.

*Primary Examiner*—Peter Chin
*Assistant Examiner*—Steven P. Griffin
*Attorney, Agent, or Firm*—Fish & Richardson PC

[57] ABSTRACT

In manufacturing a glass material used for a re-heat press method of manufacturing high-precision optical glass components including a lens, prism or the like, a glass material can be manufactured which has no defect inside of or on the surface of the glass, and without requiring a process of grinding and polishing the glass. The glass material is manufactured by dropping melted glass from the glass outlet of a glass melting furnace to a mold and cooling the dropped glass on the mold. The distance between the mold and the glass outlet is in a range which maintains the temperature of the stretched area of dropping glass—the area where the melted glass dropped on the mold is spontaneously separated by its own weight and surface tension at its softening temperature or above. The temperature of the glass around the stretched area is at least its softening temperature, and the glass around that area is instantaneously incorporated into the glass on the mold after separation. As a result, there is no difference in temperature over the entire glass, and no defect is generated inside and on the surface of the glass.

14 Claims, 6 Drawing Sheets

METHOD OF MANUFACTURING A GLASS BLANK USED FOR OPTICAL GLASS ELEMENTS

This application is a continuation of U.S. application Ser. No. 08/065,500, filed May 24, 1993, now abandoned.

FIELD OF THE INVENTION

The invention relates to a method of manufacturing a glass material used for a re-heat press method of manufacturing high-precision optical glass components including lenses, prisms or the like.

BACKGROUND OF THE INVENTION

The surfaces of optical glass lenses are preferred to be aspheric in recent years, simplifying the composition of a lens in an optical apparatus and reducing its weight. One method of manufacturing aspheric lenses is to grind and polish the glass after fabricating it from a glass block, rod, plate or the like. In a further method, melted glass is pressed with a mold beforehand to form a glass similar to the shape of the desired lens, and the molded glass is then ground and polished. Since the above-noted methods do not facilitate mass production of lenses, a method of forming lenses directly by a metallic mold has recently been promising.

The above-noted method of using a metallic mold includes a direct press method, manufacturing high-precision optical glass components by directly pressing melted glass, and a re-heat press method, providing optical glass components by pressing pre-heated glass materials (preformed materials).

In the direct press method, an optical glass component can be manufactured at a significantly low cost. However, difficulties arise in this method, when treating melted glass at high temperature, to precisely mold the glass, and there are technical problems including shortening the life of the pressing mold. Therefore, it has been difficult to apply this method to practical use.

The re-heat press method, on the other hand, can solve the above-noted problems of the direct press method. However, a relatively high cost is involved in this method, in which the procedures of manufacturing glass material are almost the same as the procedures for manufacturing a polished lens. Thus, simplification of the procedures of manufacturing glass material is an important objective of the re-heat press method.

As an effective and simple method of manufacturing a glass material, the method of dropping melted glass on a mold and letting the dropped glass cool has been proposed. Based on the above-noted method, a glass material used for the re-heat press method can be manufactured at a low cost (for instance, Japanese Patent Application No. Sho 61-146721; Japanese Patent Application No. Hei 2-34525, etc.).

One method of dropping melted glass on a mold is to cut off the melted glass, emerging from the outlet of a glass melting furnace, using a cutter. Another method is to drop-separate the melted glass spontaneously by its own weight.

Figure 3A:
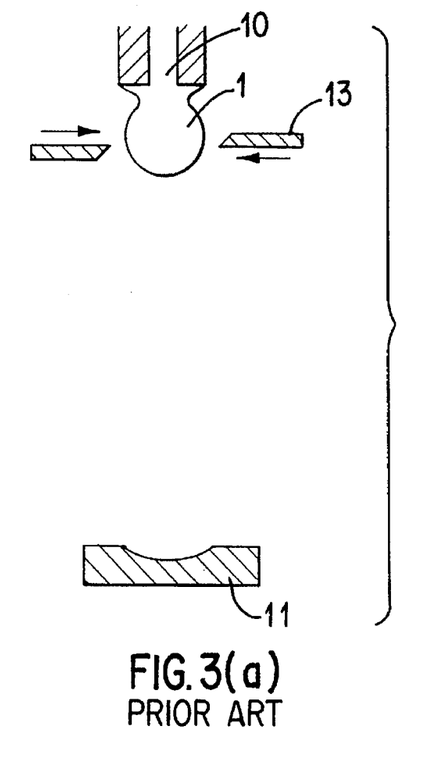
FIGS. 3(a)–3(c) is a view showing a method of manufacturing a glass material using a conventional technology.
Figure 3B:
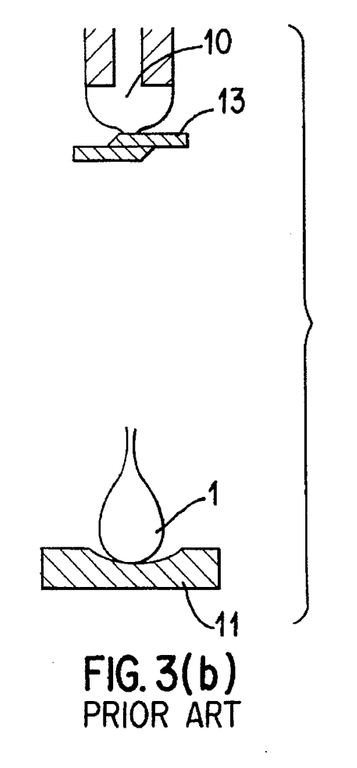
Figure 3C:
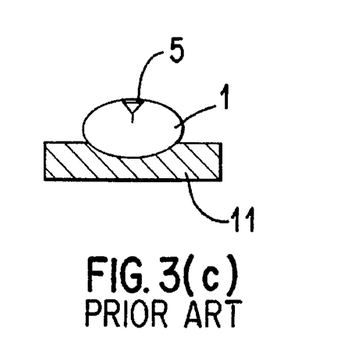

As a conventional example, FIGS. 3(a)–(c) shows a method of forming a glass material by separating melted glass using a cutter. In FIG. 3(a), the arrangement of melted glass 1 emerging from glass outlet 10 of a glass melting furnace and cutter 13, is shown. In FIG. 3(b), melted glass 1 is dropped on mold 11 after separating the glass by cutter 13. FIG. 3(c) shows defect 5 created on glass material 1. The above-noted method is highly likely to create defect 5, which is a shrinkage crack, bubble or the like generated by quenching inside or on the surface of the glass.

Figure 4A:
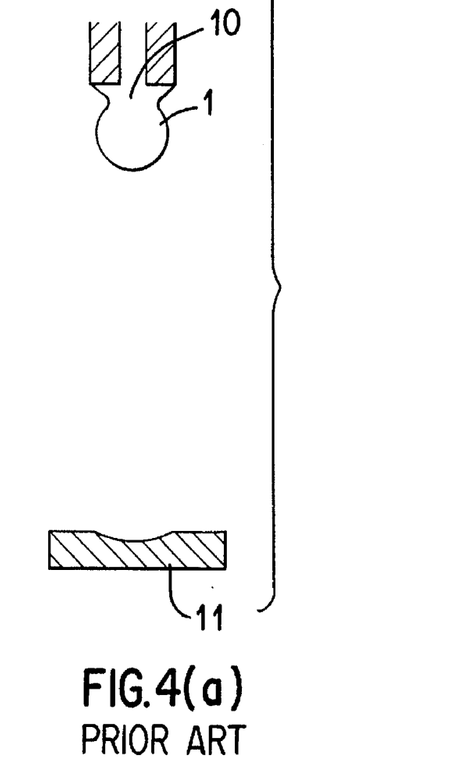
FIGS. 4(a)–4(d) is a view showing another method of manufacturing a glass material using a conventional technology.
Figure 4B:
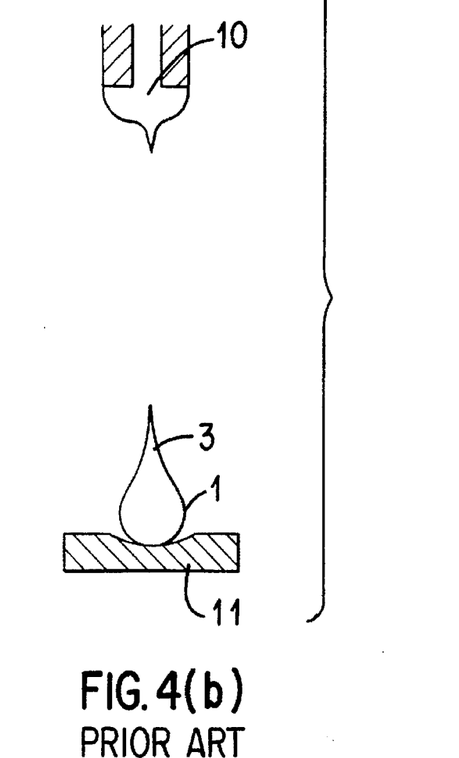

As another conventional example, a method of manufacturing a glass material by dropping melted glass on a mold and spontaneously separating it from a glass outlet by its own weight is shown in FIGS. 4(a)–(d). In FIG. 4(a), melted glass 1 is emerging from glass outlet 10 of a glass melting furnace. In FIG. 4(b), melted glass 1 is separated from the outlet by its own weight, and dropped on the mold 11. Figure (c) shows defect 5 of glass material 1.

In dropping melted glass by its own weight, a pulling force between the weight of the dropping glass and the surface tension (force toward the outlet) of the glass is generated. As a result, the diameter at the separation point of the dropping glass becomes small, thus finally separating the glass from the outlet. The glass around stretched area 3, shaped like a thin needle or a minute protrusion, tends to become colder than the rest of the glass in the dropping process.

Figure 4C:
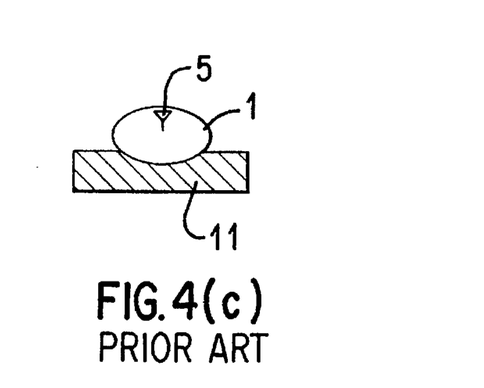

Because of the shock created by the glass landing on the mold, the glass around stretched area 3, which is colder than the rest of the glass, falls inside the glass on the mold, thereby generating a difference in temperature and a serious defect such as striae or bubbles inside the glass.

Figure 4D:
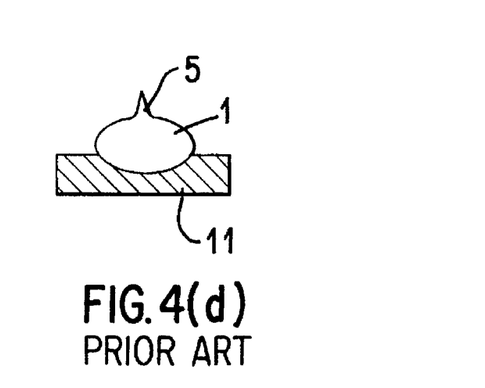

If the surface temperature of the whole dropped glass is lower than its softening temperature, the dropped glass will not restore itself to a preferable form due to its surface tension. In other words, protrusive defect 5 remains on the surface of the glass as in FIG. 4(d).

A defect inside or on the surface of the glass material manufactured by the above-noted methods cannot be eliminated even if the material is manufactured by a metallic mold.

SUMMARY OF THE INVENTION

An objective of the invention is to present a method of manufacturing a glass material having no defects at a low cost.

In order to accomplish the above objective, a method of manufacturing molded glass of the invention comprises the procedures of cooling the melted glass on a mold after dropping it from the glass outlet of a glass melting furnace, wherein the distance between the glass outlet and the mold is in a range of keeping the temperature around the stretched area of the dropping glass at least as high as the softening temperature.

It is preferable in this invention that the stretched area of the melted glass, dropping from the glass outlet, is heated to the softening temperature or above.

It is preferable in this invention that the temperature of the mold receiving the dropped melted glass is controlled.

It is preferable in this invention that the temperature of the glass—the softening temperature or above—causes the glass to have a viscosity in the range below $4.5 \times 10^7$ poise.

It is preferable in this invention that the temperature of the melted glass in the glass melting furnace is 500°–1,300° C.

It is preferable in this invention that the crucible of the glass melting furnace and the glass outlet are made of platinum.

It is preferable in this invention that the mold is located in an non-oxidizing atmosphere. The non-oxidizing atmosphere is an inert gas such as nitrogen, argon, helium or the like, or an inert gas mixed with hydrogen, thus preventing the deterioration of the mold due to oxidation.

It is preferable in this invention that the thickness of the glass material is controlled by the wettability of the mold.

It is preferable in this invention that the mold be made of a material with poor wettability against the melted glass, such as carbon, boron nitride, aluminum nitride, chromium nitride, stainless steel, nichrome, glassy carbon, silicon carbide or the like, if it is desired to make the glass material thick.

It is also preferable in this invention that the mold be covered with a chemically stable thin film of good wettability against the melted glass if it is desired to make the thickness of the glass material thin.

It is preferable in this invention that the thin film covering the mold is a precious-metal-based alloy thin film comprising at least one metal chosen from the group consisting of tungsten, tantalum, rhenium, hafnium, platinum, palladium, iridium, rhodium, osmium and ruthenium.

It is preferable in this invention that controlled heat distribution is provided to the mold. More specifically, it is preferable to locate a separate heater in the central and the peripheral part of the mold respectively, and setting the temperature of the central part higher than the peripheral part.

It is preferable in this invention that the temperature of the central portion of the mold is lowered, thus minimizing the unevenness in temperature, after dropping the melted glass on the mold. Even if the unevenness in temperature is reduced by lowering the temperature of the central portion of the mold, the temperature on the mold surface still becomes uneven by raising the temperature of the central portion of the mold after receiving the melted glass. Due to the unevenness in the temperature of the mold, the cooling velocity of the glass surface varies, thus enlarging internal strain and generating a crack. By setting the temperature of the dropping melted glass low, the unevenness in the temperature of the mold is reduced. As a result, the difference in the cooling rate of the surface temperature is eliminated, thus minimizing internal strain.

It is preferable in this invention that after dropping the melted glass on the mold, the temperature of the atmosphere where the glass surface is exposed is controlled in order to let the temperature of the exposed surface change along with the cooling rate of the surface on the mold. By controlling the temperature of the atmosphere, the unevenness of the cooling rate of the entire surface is reduced. As a result, a glass material with little internal strain can be manufactured.

It is preferable in this invention that the temperature of the mold is in a range that the melted glass does not stick to the mold and that the glass can be separated from the mold after cooling.

It is preferable in this invention that the temperature of the mold is below 700° C. The temperature, for instance, can be room temperature.

It is preferable in this invention that the center line average height (Ra) is 2 μm or less, thus enhancing the heat conductivity of the melted glass on the surface.

It is preferable in this invention that the distance between the glass outlet and the mold is kept constant to maintain the weight accuracy of the glass material within 1% of the weight of the glass. In molding a precision lens, the quality of the glass varies depending on the weight accuracy of the glass. Therefore, the fluctuation of the height due to the heat influence should be adjusted after constant measuring, thus maintaining the weight accuracy of the glass within 1% of the weight of the glass and keeping the distance between the outlet and mold constant.

It is preferable in this invention that the temperature around the separation point of the dropping melted glass is 700°–1,000° C.

It is preferable in this invention that the distance between the glass outlet and the mold is 10–100 mm.

According to the above-noted procedure, immediately after dropping the melted glass on the mold, the glass is not completely separated from the outlet; therefore, the process is unlikely to create a difference in temperature between the glass on the mold and the glass around the stretched area. In keeping the temperature of the stretched area at the softening temperature or above (maintaining the vicosity at $4.5 \times 10^7$ poise or above) by controlling the temperature of the dropping glass and the dropping distance, the dropped glass can be separated spontaneously from the outlet due to its own weight and surface tension.

The glass around the stretched area is spontaneously separated from the outlet, and instantaneously incorporated into the glass on the mold without creating a difference in temperature or a defect inside the glass. Even in case the temperature of the glass around the stretched area is lower than the rest of the glass, such a difference in temperature can be eliminated by setting the temperature of the mold to cool the glass on the mold. As a result, no defect is created inside or on the surface of the glass.

The melted glass can be spontaneously separated by its own weight and surface tension without creating a defect if the temperature of the stretched area is set at least at the softening temperature. The temperature should be kept at the softening temperature or above without being influenced by the temperature of the atmosphere, the temperature of dropping glass, the weight of the glass, the dropping distance or the like. The temperature of the stretched area can be arranged by heating that area.

By using the glass material manufactured in the above-noted procedures, a highly precise optical glass component can be provided only by pressing the material.

DETAILED DESCRIPTION OF THE INVENTION

By referring to FIGS. 1(a)–(d) and 2(a)–(d), embodiments of a method of manufacturing a glass element of the invention are specifically explained below.

Example 1

FIGS. 1(a)–(d) is a view showing the process of manufacturing a glass element of an embodiment of the invention. Numeral 1 is a glass (melted glass; glass material), and 2 is a separation point. Numeral 3 refers to a stretched area, and 4 is the surface tension of the glass. Numeral 10 is a glass outlet, and 11 is a mold. Letter h in FIG. 1(b) indicates the dropping distance of the glass from the glass outlet to the mold.

Figure 1A:
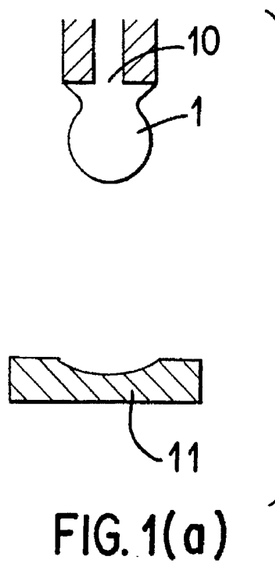
FIGS. 1(a)–1(d) is a view showing the process of manufacturing a glass material of an embodiment of the invention.

FIG. 1(a) shows the condition of melted glass 1 dropping from glass outlet 10 of the glass melting furnace (not shown). After melting glass at the melting temperature (500°–1,300° C.) of optical glasses, the melted glass is dropped out from the glass outlet by setting the temperature of the glass outlet in response to the quality and quantity of dropping glass. It is preferable that the crucible of the glass melting furnace and the glass outlet are made of platinum, which is not likely to be abraded by glass. If the diameter of the glass outlet is large enough to make the outflow force of the glass greater than the surface tension of the glass, the glass emerges in the form of a flow rather than a drop. Therefore, the diameter of the glass outlet should be adjusted along with the level of the surface tension and the weight of the dropping glass.

Figure 1B:
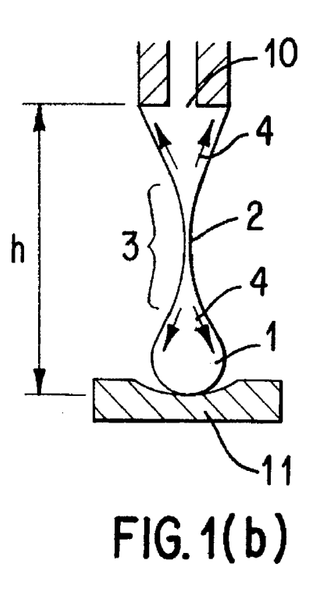

FIG. 1(b) shows the condition when melted glass 1 is dropped on mold 11 by its own weight. As shown in FIG. 1(b), the dropping distance h varies depending on the weight, temperature or quality of the dropped glass. Normally, the dropping distance h is lengthened by increasing the quantity, lowering the temperature and increasing the viscosity of the dropping glass. Concerning the quality of the glass, a lanthanum-based glass with high surface tension, for instance, requires a long dropping distance h. A dense flint glass with low surface tension, on the other hand, requires a short dropping distance h. In order to eliminate the difference in temperature between the glass on the mold and the glass around stretched area 3, and to set the temperature of entire glass to at least the softening temperature, the temperature of the dropping glass should be increased, and dropping distance h should be shortened. It is preferable that the above-noted conditions are arranged in accordance with the kinds and weight of optical glasses. A suitable dropping distance h (decided by the kinds and weight of optical glasses) should be maintained at the same level; in other words, the weight of the glass is changed by the fluctuation of the height of the mold, and the accuracy in weight worsens if the height fluctuates.

Figure 1C:
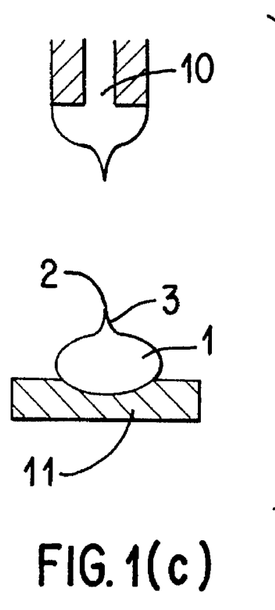

FIG. 1(c) shows glass 1 on mold 11, which is spontaneously cut off at separation point 2 by surface tension 4 of both the dropped glass 1 and the glass remaining on glass outlet 10. It is easy to spontaneously cut off a glass with large surface tension and low viscosity. The shape of the mold can be arranged in accordance with the preferred shape of the glass material. In order to prevent the dropped glass from being cracked by quenching, the mold should be heated beforehand. In case the temperature of the glass around the stretched area is lower than the rest of the glass, the temperature of the mold should be controlled at a suitable level, and the dropped glass should be cooled. As a result, the difference in temperature would be eliminated, thus not providing a defect-free glass material.

Figure 1D:
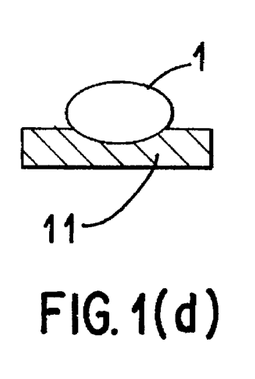

In FIG. 1(d), stretched area 3, spontaneously separated from the outlet, is instantaneously incorporated into glass 1 on the mold, thereby forming glass material 1.

The method of manufacturing in FIGS. 1(a)–(d) is described below in detail. Mold 11 had a concave mold surface 10 mm in diameter at its center, and was made of austenire-based stainless steel (SUS316). Boro-silicate barium glass, comprised of 30% by weight of silicon oxide ($SiO_2$), 50% by weight of barium oxide (BaO), 15% by weight of boron oxide ($B_2O_3$) and 5% by weight of trace elements, was used as the melted glass. After heating the glass of the above-noted composition to 1,250° C., about 1 gram of melted glass 1 was dropped from the outlet, which was kept at 1,000° C., onto mold 11. The mold was preheated to 350° C., and the dropping distance h was 50 mm. As a result, glass material 1 was formed by cooling on the mold.

After observing glass material 1 of this example with a light optical microscope, no defect, including a crack, stria, bubble or the like, was detected. As a result, it was possible to obtain a highly precise optical glass component by forming the glass material using the above procedure.

Example 2

By applying the manufacturing method shown in FIGS. 1(a)–(d), a glass material with a different composition was manufactured. Silicon carbide (SIC) was used for mold 11, having a concave mold surface 10 mm in diameter at its center. A dense flint glass, comprised of 52% by weight of silicon oxide ($SiO_2$), 6% by weight of potassium oxide ($K_2O$), 35% by weight of lead oxide (PbO) and 7% by weight of trace elements, was used as melted glass. After heating the above-noted glass to 1,250° C., about 1 gram of melted glass was dropped from outlet 10, which was kept at 900° C. While maintaining the dropping distance h at 30 mm, the glass was dropped on mold 11, which had been preheated to 350° C. Glass material 1 was formed after cooling the glass on the mold.

After observing glass material 1 of the example with an optical microscope, no defect such as a crack, stria, bubble or the like was found inside or on the surface of the glass. As a result, a precise optical glass component was provided by the above procedure.

Example 3

FIGS. 2(a)–(d) shows the procedures for manufacturing a glass material in another example of the invention. Numeral 1 indicates glass (melted glass; glass material), and 2 shows a separation point. Numeral 3 represents a stretched area. Numeral 10 is a glass outlet, and 11 is a mold. Numeral 12 shows a heating means. Letter h in FIG. 2(b) indicates the dropping distance of the glass.

Figure 2A:
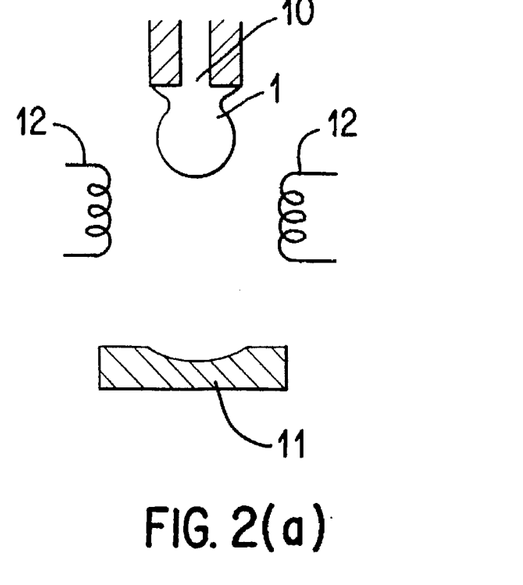
FIGS. 2(a)–2(d) is a view showing the process of manufacturing a glass material of another embodiment of the invention.

FIG. 2(a) shows the arrangement of melted glass 1, dropping from glass outlet 10 of a glass melting furnace (not shown), and heating means 12. Heating means 12 surrounds stretched area 3 (area where melted glass thins).

Figure 2B:
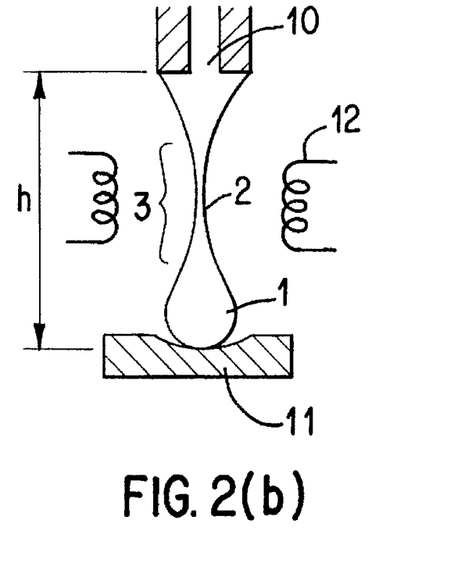

FIG. 2(b) shows the arrangement of melted glass 1, dropped on mold 11 by its own weight, and the heated and stretched area of the glass produced by heating means 12. It is preferable that an adiabatic wall be produced with the heating means, limiting the impact of room temperature, surrounding stretched area 3 of the glass. The size of the heating means should be changed in accordance with dropping distance h.

Figure 2C:
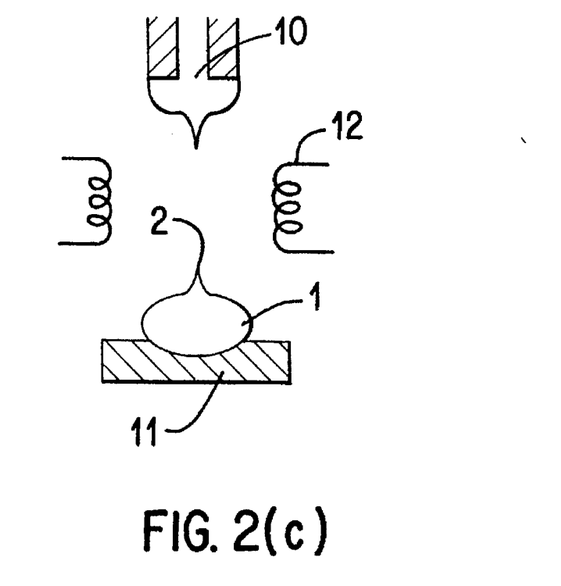

In FIG. 2(c), glass 1 is spontaneously separated at separation point 2 by the surface tension of both glass 1 on mold 11 and the glass remaining on glass outlet 10.

Figure 2D:
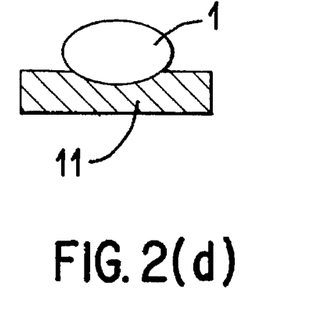

In FIG. 2(d), the glass around stretched area 3 was incorporated into glass 1 on the mold, thereby forming glass material 1.

The method of manufacture shown in FIGS. 2(a)–(d) is specifically described below. The base metal of mold 11, having a concave surface 20 mm in diameter at its center, was cemented alloy steel (WC-5Ti-8Co), covered with a thin film of a platinum-iridium-osmium alloy (Pt—Ir—Os) by a sputtering method. A lanthanum glass, comprised of 8% by weight of zirconia ($ZrO_2$), 30% by weight of lanthanum oxide ($La_2O_3$), 42% by weight of boron oxide ($B_2O_3$), 10% by weight of potassium oxide (CaO) and 10% by weight of trace elements, was used as melted glass. After heating the above-noted glass in the crucible of a glass melting furnace to 1400° C., about 2 grams of melted glass 1 was dropped from outlet 10, which was kept at 1,100° C., with a dropping distance h of 100 mm. The glass around stretched area 3 was heated to 900° C. by being surrounded with a heater at a height of 50 mm. The melted glass was dropped on mold 11, which had been heated to 430° C. beforehand. The dropped glass was cooled on the mold, thus forming a glass material 1.

After observing glass material 1 of the example with an optical microscope, no defect such as a scar, stria, bubble or the like was found. By forming the glass material produced in the above-noted method, a precision optical component was provided.

Example 4

By applying the method used in FIGS. 2(a)–(d), a glass material with a different composition was formed. Cermet alloy (TiC-10Mo-9Ni) was used as a base material of mold 11, having a concave surface 20 mm in diameter at its center, and the mold was covered with a thin film of a platinum-tantalum-rhenium alloy (Pt—Ta—Re). A borosilicate glass, comprised of 65% by weight of silicon oxide ($SiO_2$), 9% by weight of potassium oxide ($K_2O$), 10% by weight of boron oxide ($B_2O_3$), 10% by weight of sodium oxide and a minor component, was used as the melted glass. After heating the above-noted glass in the crucible of a glass melting furnace to 1,350° C., about 2 grams of melted glass 1 was dropped from outlet 10, which was kept at 1,070° C., with a dropping distance h of 100 mm. The glass around stretched area 3 was heated to 850° C. by a heater, surrounding the area at a height of 50 mm. The glass was dropped on mold 11, which had been pre-heated to 400° C., and the glass then cooled, thus forming glass material 1.

After observing glass material 1 of the example with a light optical microscope, no defect such as a scar, stria, bubble or the like was found. By forming the glass material produced in the above-noted method, a precise optical element was provided.

Example 5

Figure 5:
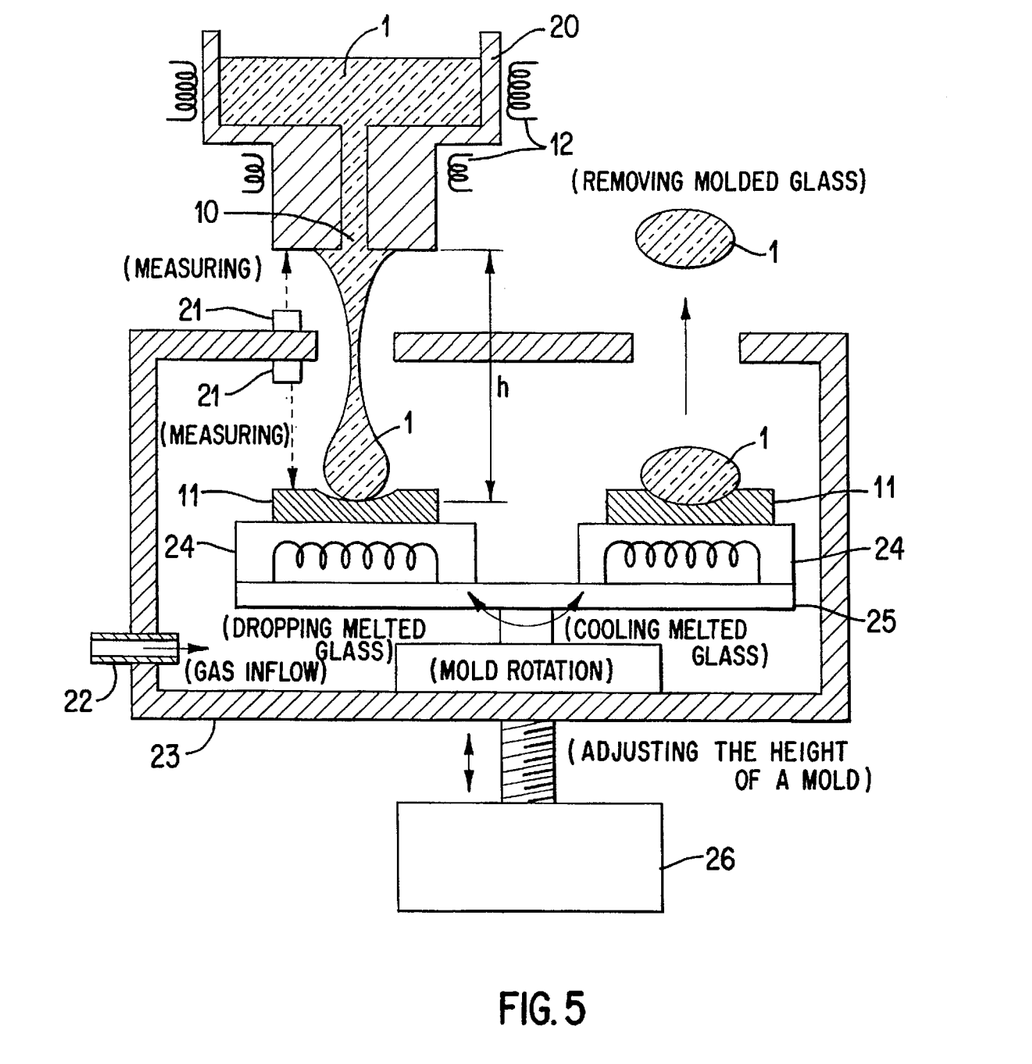
FIGS. 5 is a view showing a method of manufacturing a glass material of another embodiment of the invention.

FIG. 5 is a view showing the process of manufacturing a glass element of another embodiment of the invention. In FIG. 5, 1 is a glass (melted glass; glass material), and 10 is a glass outlet. Numeral 11 is a mold, 20 is a crucible and 21 is a measuring means. Numeral 22 shows a gas inlet, and 23 is a cover. Numeral 24 is a temperature controlling means; 25 is a shifting means; 26 shows a position controlling means. Letter h indicates the dropping distance of the glass from the glass outlet to the mold.

In FIG. 5, the mold, the temperature controlling means and the shifting means are all located inside the cover. An inert gas such as nitrogen, argon, helium or the like, or an inert gas mixed with hydrogen is let in the cover from the gas inlet, thus keeping the atmosphere inside the cover unoxidized.

In manufacturing a precision optical glass component, the quality and molding conditions of the glass vary depending on the weight accuracy of the glass. Therefore, fluctuation of the weight accuracy should be maintained within 1%. (Such fluctuation is caused by the changes in the dropping distance due to the fluctuation of the distance between the outlet and the mold, and in the position of the separation point.) In order to keep the distance between the outlet and the mold constant, the fluctuation of the height due to the influence of heat, such as the expansion and contraction of the outlet and the mold, is eliminated by the position controlling means (i.e., servomotor), adjusting the height of the mold, after constant measuring.

An embodiment of a method of manufacturing a glass material shown in FIG. 5 is specifically described below.

Nitrogen gas was let in cover 23 from gas inlet 22, thus creating an non-oxidizing atmosphere inside the cover. The base metal of mold 11, having a concave surface 10 mm in diameter at its center, was cermet alloy (TiC-10Mo-9Ni), and covered with a thin film of a platinum-iridium-osmium alloy (Pt—Ir—Os) by a sputtering method. A borosilicate barium glass, comprised of 30% by weight of silicon oxide ($SiO_2$), 50% by weight of barium oxide (BaO), 15% by weight of boron oxide ($B_2O_3$) and 5% by weight of trace elements, was used as the melted glass. After heating the above-noted glass in the crucible of a glass melting furnace to 1,250° C., 1±0.005 grams of melted glass 1 was dropped from outlet 10, which was kept at 1,000° C., while maintaining a dropping distance h of 50 mm by a measuring means 21 and a position controlling means 26. The glass was dropped on mold 11, which had been pre-heated to 650° C., and the glass then cooled on the mold by a temperature controlling means 24. Finally, the mold was rotated by a shifting means 25 to remove glass material 1 from the mold.

After observing glass material 1 of the example with an optical microscope, no defect such as a scar, stria, bubble or the like was found. By forming the glass material produced in the above-noted method, a precise optical material was provided.

Example 6

Figure 6A:
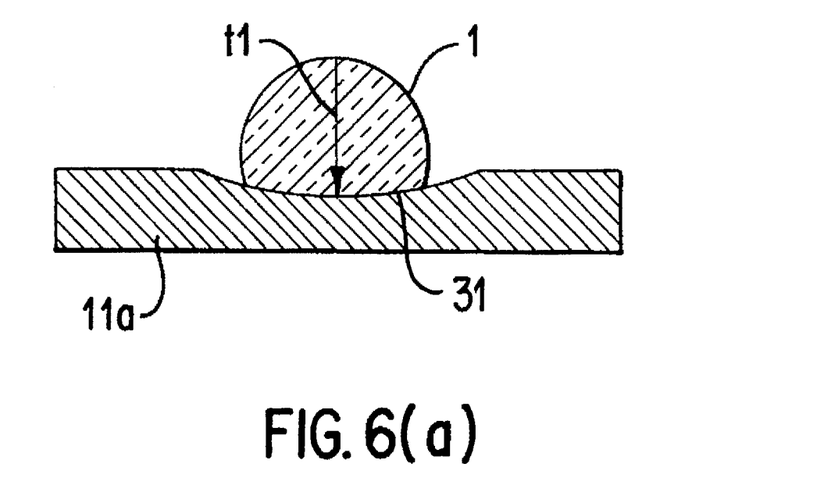
FIGS. 6(a)–6(b) shows cross-sectional views of glass materials of another embodiment of the invention.
Figure 6B:
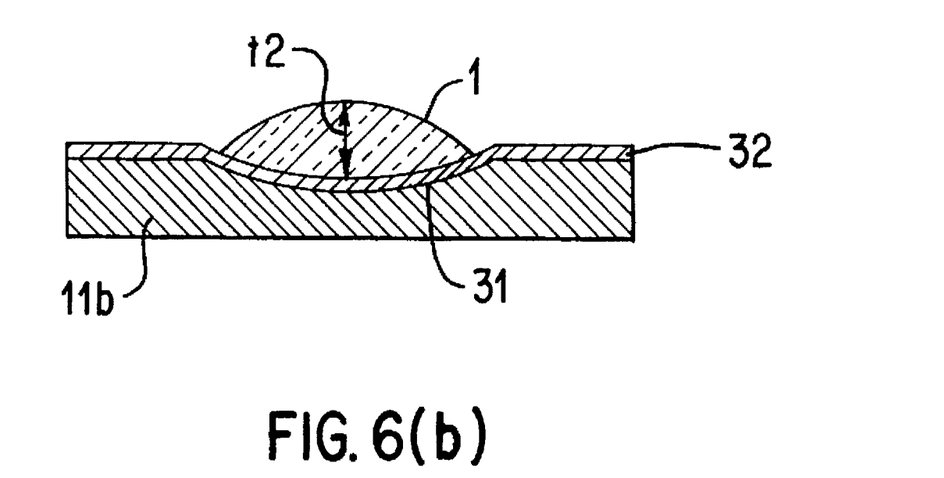

FIGS. 6(a)–(b) shows cross-sectional views of glass materials of another embodiment of the invention.

Numeral 1 indicates glass (melted glass; glass material). Numeral 11a is a mold with poor wettability, and 11b shows a mold with good wettability. Numeral 31 shows a concave mold surface. Letters t1 and t2 indicate the thickness of glasses.

The mold with poor wettability is made of a material such as carbon, boron nitride, aluminum nitride, chromium nitride, stainless steel, nichrome, glassy carbon, silicon carbide or the like. The mold with good wettability, on the other hand, is covered with a precious-metal-based alloy thin film 32 comprising at least one metal chosen from the group consisting of tungsten, tantalum, rhenium, hafnium, platinum, palladium, iridium, rhodium, osmium and ruthenium. The thin film is chemically stable, and has good wettability.

As shown in FIG. 6(a), the thickness of the glass dropped on the mold with poor wettability becomes t1 due to the surface tension of the glass and the wettability of the mold. Therefore, a thick glass material with a small radius of curvature can be provided.

As shown in FIG. 6(b), the thickness of the glass dropped on the mold with good wettability becomes t2, thereby providing a thin glass material with a large radius of curvature.

Generally, the wettability of the mold against the melted glass is improved by raising the temperature of the mold. In case the mold has poor wettability, however, the melted glass is likely to stick to the mold, and the glass cannot be separated easily from the mold after cooling. In this sense, the temperature of the mold should be below 400° C. In using the mold covered with a chemically stable thin film of good wettability, however, the melted glass is not likely to stick to the mold. As a result, the mold can be heated up to 700° C., thus producing a thin glass material. Although the glass can be easily and cheaply manufactured by using the mold with poor wettability, the material of the mold should be selected in accordance with the purpose, shape and cost of the glass material.

It is preferable that concave mold surface 31 (surface contacting the melted glass) in FIGS. 6(a)–(b) is gently concave, and that the center line average height of the surface is 2 μm or less, thus providing a high-precision optical glass component.

"Center line average height" is defined by a surface roughness test JIS B-0651.

An example using the mold shown in FIGS. 6(a)–(b) is specifically described below.

Mold 11a with poor wettability shown in FIGS. 6(a)–(b) was made of stainless steel, and had concave mold surface 31 with a radius of curvature of 15 mm. The center line average height of the mold was 2 μm. Under the same conditions of example 1, the glass with a thickness of 6 mm (t1) was molded after dropping 1 gram of melted glass on the mold. By forming the glass material produced in the above-noted method, a precision optical component with a thickness of 5 mm was provided. The component had no defect, and was highly precise.

The base metal of mold 11b was cermet alloy (Tic-10Mo-9Ni), and the radius of curvature of the concave mold surface was 15 mm. The center line average height of the mold was 2 μm. The mold was covered with a thin film of good wettability, comprised of platinum, tantalum and platinum alloy (Pt—Ta—Rc), applied by a sputtering method. Under the same conditions of example 5, a glass material with a thickness of 4 mm (t2) was molded after dropping 1 gram of melted glass on the mold. By forming the glass material produced in the above-noted method, a precision optical component with a thickness of 3 mm was provided. The component had no defection, and was highly precise.

This invention is not limited by the compositions of optical glasses, shapes of glass materials, heating methods and conditions of glass melting furnaces and molds or the like as explained in the above-noted examples.

As noted above, the invention does not require a grinding or polishing procedure, and can provide an excellent glass material, which has no defect either inside or on its surface, and has a preferable shape for a re-heat press method. As a result, the invention can significantly contribute to reducing the cost of, and improving the productivity of, glass material manufacturing.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method of manufacturing a glass blank used for optical elements comprising the steps of:

allowing molten glass to flow from a glass outlet of a glass melting furnace to a mold so that a constriction point is formed in said molten glass between said glass outlet and said mold;

allowing said molten glass to spontaneously separate at said constriction point by surface tension of the glass flowing from said glass outlet above said constriction point and by the weight of the molten glass and surface tension between the glass said constriction point and the molten glass contacting the mold so as to drop a fixed amount of molten glass on said mold; and cooling and solidifying the fixed amount of molten glass on said mold to form a glass blank;

wherein a distance between said glass outlet and said mold is arranged so that said molten glass first contacts said mold before separation at the constriction point, and so that said molten glass is separated at said constriction point by surface tension of the glass flowing from said glass outlet above said constriction point and by the weight of the molten glass and surface tension between the glass below said constriction point and the molten glass contacting the mold, and further wherein the distance does not change substantially during dropping of the molten glass.

2. The method according to claim 1, wherein the constriction point of the molten glass formed between the glass outlet and the mold is heated to the softening temperature or higher of the molten glass.

3. The method according to claim 1, further comprising controlling the temperature of the mold.

4. The method according to claim 3, wherein the mold has a controlled temperature so that the glass blank can be removed from said mold, and so that said glass blank can be separated from said mold after cooling.

5. The method according to claim 4, wherein the mold has a temperature below 700° C.

6. The method according to claim 1, wherein the molten glass in the glass melting furnace has a temperature of the softening temperature or higher of the molten glass, and wherein said temperature is from 500° C. to 1,300° C.

7. The method according to claim 1, wherein the glass melting furnace comprises a crucible, and wherein said crucible and the glass outlet are made of platinum.

8. The method according to claim 1, wherein the mold is placed in a non-oxidizing atmosphere.

9. The method according to claim 1, further comprising constantly measuring and controlling the distance between the glass outlet and the mold so as to drop a fixed amount of molten glass on said mold.

10. The method according to claim 1, wherein the molten glass dropped on the mold has a thickness controlled by wettability of said mold.

11. The method according to claim 10, wherein the mold is made of at least one material selected from the group consisting of carbon, boron nitride, aluminum nitride, chromium nitride, stainless steel, nichrome, glassy carbon and silicon carbide.

12. The method according to claim 10, wherein the mold is covered with a chemically stable thin film having wettability with respect to molten glass.

13. The method according to claim 12, wherein the chemically stable thin film is a precious metal-based alloy thin film comprising at least one metal selected from the group consisting of tungsten, tantalum, rhenium, hafnium, platinum, palladium, iridium, rhodium, osmium and ruthenium.

14. The method according to claim 1, wherein the molten glass dropped on the mold has a center line average height (Ra) of 2 μm or less.

\* \* \* \* \*